April 9, 1929.  A. L. SHAW  1,707,998
CONVEYER
Filed May 3, 1928
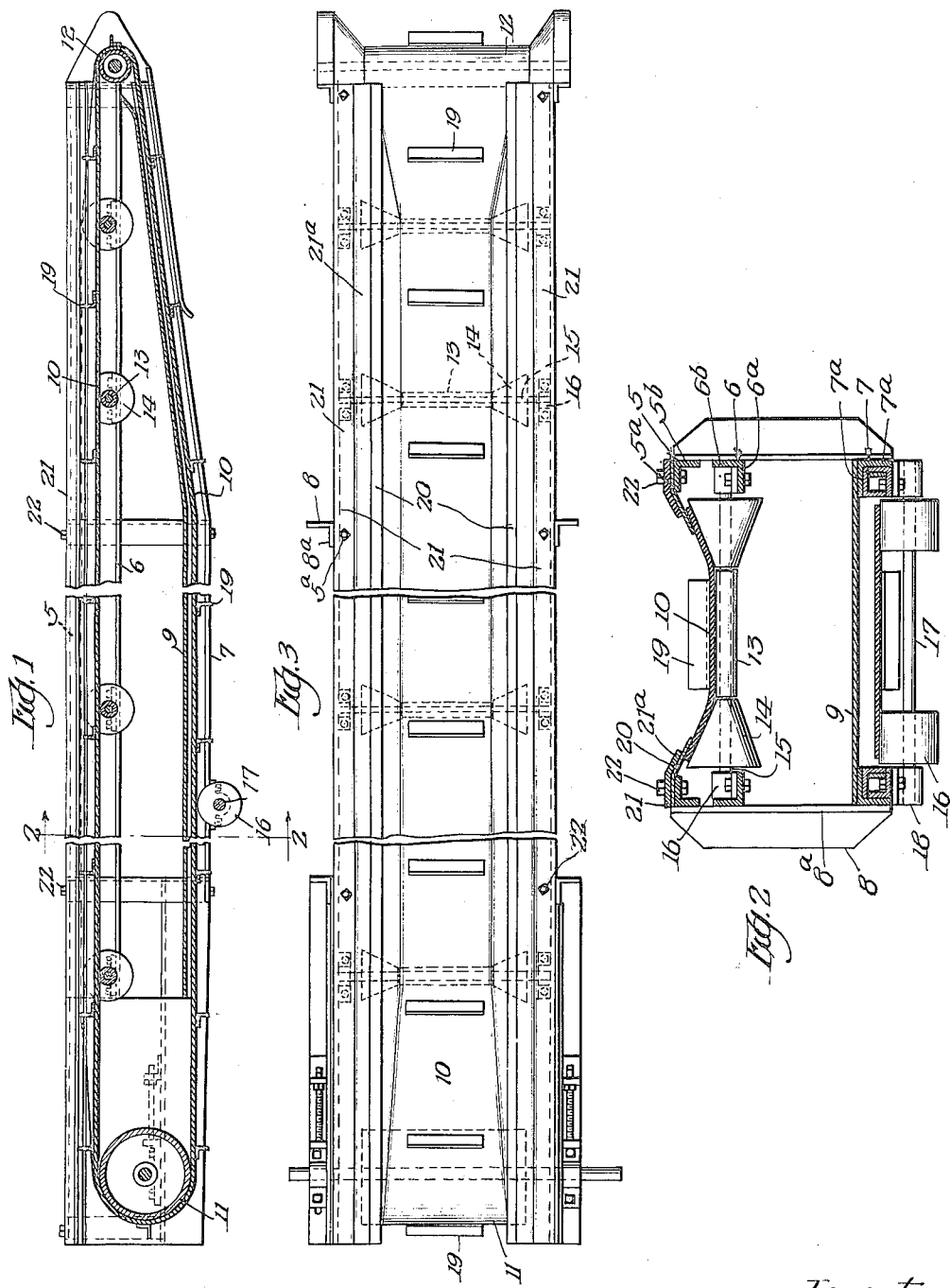
Inventor
Arthur L. Shaw
By Fred Gerlach
Atty.

Patented Apr. 9, 1929.

1,707,998

UNITED STATES PATENT OFFICE.

ARTHUR L. SHAW, OF CHICAGO, ILLINOIS, ASSIGNOR TO CHICAGO AUTOMATIC CONVEYOR CO., OF CHICAGO, ILLINOIS, A CORPORATION OF ILLINOIS.

CONVEYER.

Application filed May 3, 1928. Serial No. 274,701.

The invention relates to conveyers and more particularly to those conveyers which are adapted for use in moving coal, coke, ashes, crushed stone and other such material, and embody an angle iron supporting frame, an endless conveyer belt and a series of roller units.

In conveyers of this character, it has heretofore been proposed to provide stationary longitudinally extending guide belts at the sides or margins of the upper or operative reach of a flat conveyer belt for the purpose of preventing transverse displacement of the material during the conveying operation. These guide belts are generally connected at their upper margins to the angle iron frame and the lower margins thereof are left in suspension and curved inwardly to the trough-like sides which contact with the margins of the moving conveyer belt and are sufficiently resilient or flexible to maintain the necessary contact therewith during transit of the material. In practice, this arrangement has proved to be inefficient because the material often bears against the guides and presses them outwardly with such force that the edges of the curved trough-forming margins cut into the contiguous marginal parts of the endless conveyer belt and wear results.

The primary object of the present invention is to provide a conveyer unit having guide belts which are so arranged with respect to the roller units for the upper reach of the conveyer belt that lateral or transverse displacement of the material is effectively prevented and wear resulting from frictional engagement of said guide belts and the endless conveyer is reduced to a minimum. In general, this improved conveyer construction consists of roller or supporting units having oppositely extending conical troughing rollers at the ends thereof for bending or turning the side margins of the endless conveyer upwardly and stationary guide belts which are secured to the top bars of the frame and are bent so that the operative inner portions thereof lap the side margins of the conveyer belt and are substantially parallel therewith. A characteristic of this arrangement is that the inner edges of the guide belts do not contact with the conveyer belt and consequently do not produce friction which manifestly results in wear. Furthermore, the material is precluded from working between the guide belts and the contiguous marginal parts of the conveyer belt and from passing over the edges of the said conveyer belt.

Another object of the invention is to provide a conveyer unit which is of new and improved construction, embodies a comparatively small number of parts and may be readily manufactured and produced at a low cost.

A further object of the invention is to provide a conveyer which is an improvement upon the one disclosed in Letters Patent of the United States No. 1,422,002, granted to me July 4, 1922.

Further objects and advantages will be apparent from a consideration of the following detailed description.

In the drawing which accompanies and forms a part of this specification or disclosure and in which like numerals or characters of reference denote corresponding parts throughout the several views:

Figure 1 is a vertical longitudinal section of a conveyor unit embodying the invention;

Figure 2 is a sectional view taken on line 2—2 of Figure 1; and

Figure 3 is a plan view.

The invention is exemplified in a conveyer which is adapted for use in moving coal and other granular material and comprises a metallic frame-work or supporting frame. The latter is mounted in any suitable manner so that it may be properly positioned with respect to the material to be moved and consists of a pair of sides, each embodying an upper longitudinally extending angle iron bar 5, an intermediate angle iron bar 6, and a lower angle iron bar 7. These three bars are spaced apart and are secured to a longitudinal series of angle iron uprights 8 to form a rigid structure. The two sides of the supporting frame are held in spaced relation by a substantially imperforate plate 9 which is bolted or riveted to the horizontal and inwardly extending legs 7$^a$ of the lower bars 7. The upper bars 5 are arranged so that their horizontal legs 5$^a$ are at the top and extend inwardly. The vertical legs 5$^b$ of the bars 5 are bolted or riveted to the longitudinally extending legs 8$^a$ of the uprights. The intermediate bars 6 are positioned in close proximity to the upper bars and are arranged so that their horizontal legs 6$^a$ are at the bottom and project inwardly in the same manner as the legs 5$^a$ of said upper bars 5. The vertical legs 6$^b$ of the bars 6 are bolted or riveted to the legs 8ª of the angle iron uprights. The lower bars 7 are arranged similarly to the upper bars in that the horizontal legs 7ª thereof are at the top.

An endless belt 10 which is preferably formed of leather or treated fabric is disposed between the sides of the supporting frame and is supported at the ends thereof by pulleys 11 and 12 which are suitably mounted in place adjacent the receiving and discharge ends of the conveyer respectively. The pulley 11 is driven by any suitable mechanism, such, for example, as a sprocket and chain, to impart movement to the belt 10. The upper reach of said belt is positioned between the upper and intermediate bars 5 and 6 and is supported upon a longitudinal series of roller units. Each of these units comprises a central substantially cylindrical supporting roller 13 and troughing rollers 14 which are fixed to a shaft 15. The latter is journalled in a pair of bearing brackets 16 which are secured to the horizontal legs 6ª of the intermediate bars 6. The troughing rollers 14 are frusto-conical in form and operate to turn upwardly the marginal parts of the operative upper reach of the belt. The lower reach is disposed beneath the plate 9 and is supported upon a lower longitudinal series of roller units. Each of the latter consists of a pair of rollers 16 which are fixed to a shaft 17 and are spaced so as to engage and support the marginal part of the belt. The shaft 17 of each lower roller unit is journalled in a pair of bearing brackets 18 which are secured to the lower bars 7. The plate 9 operates as a shield and prevents any displaced material from falling upon the lower reach of the belt. Angle iron members 19 are fixed to the outer surface of the central portion of the belt and operate as drags.

To center the material on the upper reach of the endless conveyer belt a pair of longitudinal guide belts 20 are provided. These guide belts are formed of any suitable more or less flexible material and have the outer side margins thereof clamped between the horizontal legs 5ª of the upper bars and a pair of longitudinal metallic plates or strips 21 by bolts 22. The inner side margins of the belts 20 are bent downwardly so as to lap the upturned portions of the belt 10, by means of flanges 21ª which extend inwardly and downwardly from the clamp-strips 21. The belts 20 and the strips 21 are substantially coextensive with the upper bars 5 so that the material on the conveyer belt is centered during the entire travel thereof from one end of the conveyer to the other. The flanges 21ª are angled with respect to said strips 21 so that the bent inner side margins of the guide belts are substantially parallel with the contiguous marginal parts of the belt 10 and bear thereagainst. A characteristic of positioning the guide belts and supporting the operative part of the conveyer belt in this manner is that the material is effectively precluded from working over the sides of the belt. Furthermore the inner edges of the guide belts do not bear against the marginal upturned part of said conveyer belt and produce wear. The flanges 21ª terminate adjacent the side edges of the conveyer belt with the result that the inner and operative margins of the guide belts are in suspension and are free to move downwardly into engagement with the belt 10 in response to the pressure or weight of the material. It is manifest that when the material being conveyed spreads outwardly so as to lap the upturned parts of the conveyer belt, it forces the guide belts downwardly into engagement with the contiguous parts of said conveyer belt and thus is prevented from working over the side edges of the belt. By utilizing flanged metallic plates of the character disclosed, the guide belts are stationarily held in place and are adequately protected against damage. To replace these guide belts it is only necessary to remove the bolts 22 and then raise the strips 21 and substitute new strips for the old.

The conveyer unit disclosed herein is exceedingly efficient in that the material is effectively held in place on the conveyer belt against lateral or transverse displacement. Furthermore, it embodies but a comparatively small number of parts and may be manufactured at a low cost.

While the invention has been described as being associated with a certain type of conveyer it is to be understood that it should not be limited to the specific details set forth, since these may be modified within the scope of the appended claims, without departing from the spirit and scope of the invention.

Having thus described the invention, what I claim as new and desire to secure by Letters Patent, is:

1. In a conveyer, the combination of a supporting frame, an endless conveyer belt, pulleys for the ends of said belt, a roller unit for supporting the upper reach of the belt, and longitudinally extending guide members formed of flexible strips and having their outer side margins secured to the sides of the supporting frame respectively and their inner side margins overlapping and extending substantially parallel with the marginal parts of said belt.

2. In a conveyer, the combination of a supporting frame, an endless conveyer belt, pulleys for the ends of said belt, a unit for supporting the upper reach of the belt so that the marginal parts thereof project upwardly and outwardly, and longitudinally extending guide members having their outer side margins secured to the supporting frame and their side inner margins overlapping and extending substantially parallel with the said marginal parts of the endless belt.

3. In a conveyer, the combination of a supporting frame, an endless conveyer belt, pulleys for the ends of said belt, a unit for supporting the upper reach of the belt, said unit embodying troughing rolls arranged so as to cause the marginal parts of the belt to extend upwardly and outwardly, and longitudinally extending guide members having their outer side margins secured to the supporting frame and their inner margins overlapping and extending substantially parallel with the said marginal parts of the endless belt.

4. In a conveyer, the combination of a supporting frame, an endless conveyer belt, pulleys for the ends of said belt, a roller unit carried by the frame for supporting the upper reach of the belt, longitudinally extending guide members having their outer side margins secured to the supporting frame, and plates overlying said outer side margins of the guide members and having flanges operative to deflect downwardly the inner side margins of said members so as to lap the marginal parts of the endless belt.

5. In a conveyer, the combination of a supporting frame, an endless conveyer belt, pulleys for the ends of said belt, a unit for supporting the upper reach of the belt so that the marginal parts thereof project upwardly and outwardly, longitudinally extending guide members formed of flexible strips and having their outer side margins secured to the supporting frame, and means for deflecting the outer side margins of said guide members so that they overlap and extend substantially parallel with said marginal parts of the endless belt.

6. In a conveyer, the combination of a supporting frame comprising a pair of longitudinally extending side bars, an endless conveyer belt, pulleys for the ends of said belt, a roller unit carried by the frame for supporting the upper reach of the belt, longitudinally extending plates overlying the side bars, and guide members formed of flexible strips, said members being clamped between said side bars and plates and having the inner side margins thereof extending so as to overlap the marginal parts of the belt.

Signed at Chicago, Illinois, this 24 day of April, 1928.

ARTHUR L. SHAW.